(12) United States Patent
Carlson

(10) Patent No.: US 9,744,828 B2
(45) Date of Patent: Aug. 29, 2017

(54) PRESSURE RELIEF VALVE

(71) Applicant: ILLINOIS TOOL WORKS INC., Glenview, IL (US)

(72) Inventor: Daniel D. Carlson, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 75 days.

(21) Appl. No.: 14/767,617

(22) PCT Filed: Mar. 14, 2013

(86) PCT No.: PCT/US2013/031272
§ 371 (c)(1),
(2) Date: Aug. 13, 2015

(87) PCT Pub. No.: WO2014/142866
PCT Pub. Date: Sep. 18, 2014

(65) Prior Publication Data
US 2015/0375598 A1    Dec. 31, 2015

(51) Int. Cl.
*F16K 1/20* (2006.01)
*F16K 15/04* (2006.01)
(Continued)

(52) U.S. Cl.
CPC ......... *B60H 1/00485* (2013.01); *B60H 1/249* (2013.01); *F16K 1/2014* (2013.01);
(Continued)

(58) Field of Classification Search
CPC .... F16K 1/2071; F16K 1/2066; F16K 15/033; F16K 15/16; F16K 17/0493; F16K 1/266;
(Continued)

(56) References Cited

U.S. PATENT DOCUMENTS 378,191 A * 2/1888 Clough ................. E05F 1/1083
16/73
3,026,902 A * 3/1962 Ruhl, Jr. ................. B67D 7/52
137/484

(Continued)

FOREIGN PATENT DOCUMENTS

DE  3601853   8/1987
DE  3919211  12/1990
(Continued)

OTHER PUBLICATIONS

Extended European Search Report for EP App. No. 13878170.3-1756/2969614, dated Nov. 14, 2016.

*Primary Examiner* — Mary McManmon
*Assistant Examiner* — Hailey K Do
(74) *Attorney, Agent, or Firm* — Joseph M. Butscher; The Small Patent Law Group, LLC

(57) ABSTRACT

An apparatus for use in venting a compartment in a vehicle includes a housing which at least partially defines an air flow passage. A valve element moves from a closed condition to an open condition to enable air to flow through the air flow passage. The valve element has an inner surface facing the air flow passage when the valve element is in the closed condition. The valve element has an outer surface opposite the inner surface facing away from the air flow passage when the valve element is in the closed condition. A spring wire deflects as the valve element moves from the closed condition toward the open condition and is effective to urge the valve element toward the closed condition. The spring wire extends in a straight line from the housing to the inner surface of the valve element when the valve element is in the closed condition.

18 Claims, 5 Drawing Sheets

(51) Int. Cl.
*F16K 17/04* (2006.01)
*F16K 27/02* (2006.01)
*B60H 1/00* (2006.01)
*F16K 15/16* (2006.01)
*F16K 15/03* (2006.01)
*B60H 1/24* (2006.01)
*F16K 17/02* (2006.01)
*F16K 24/04* (2006.01)
*F16K 31/12* (2006.01)

(52) U.S. Cl.
CPC .......... *F16K 1/2071* (2013.01); *F16K 15/031* (2013.01); *F16K 15/033* (2013.01); *F16K 15/16* (2013.01); *F16K 17/02* (2013.01); *F16K 24/04* (2013.01); *F16K 27/0227* (2013.01); *F16K 31/12* (2013.01); *Y10T 137/784* (2015.04); *Y10T 137/7845* (2015.04); *Y10T 137/7893* (2015.04); *Y10T 137/7898* (2015.04)

(58) Field of Classification Search
CPC ........ F16K 17/04932; F16K 7/18; F16K 1/16; F16K 1/18; F16K 1/20; F16K 1/2014; F16K 15/144; F16K 15/031; F16K 15/035; F16K 15/038; F16K 17/0413; F16K 17/0453; F16K 27/0227; Y10T 137/7891; Y10T 137/7893; Y10T 137/7898; Y10T 137/784; 137/7843; Y10T 137/7845; B60H 1/249

USPC ..... 137/855, 857, 527, 512.15, 512.4, 512.5
See application file for complete search history.

(56) References Cited

U.S. PATENT DOCUMENTS

| | | | | |
|---|---|---|---|---|
| 3,640,306 | A * | 2/1972 | Vogt | F16K 15/035 |
| | | | | 137/512.1 |
| 4,196,745 | A * | 4/1980 | Schutzer | F16K 1/223 |
| | | | | 137/512.1 |
| 4,825,902 | A * | 5/1989 | Helms | E21B 21/10 |
| | | | | 137/515 |
| 6,050,294 | A * | 4/2000 | Makowan | E03B 7/077 |
| | | | | 137/527 |
| 8,360,104 | B2 * | 1/2013 | Shereyk | B60H 1/249 |
| | | | | 137/852 |
| 8,439,088 | B2 * | 5/2013 | Bramson | B60K 15/0403 |
| | | | | 137/527 |
| 8,955,542 | B2 * | 2/2015 | Kiezulas | B60H 1/249 |
| | | | | 137/512 |
| 2005/0081921 | A1 | 4/2005 | Blake, III et al. | |
| 2011/0041930 | A1 | 2/2011 | Kiezulas | |
| 2012/0211689 | A1 * | 8/2012 | Bostwick | F02M 37/0076 |
| | | | | 251/301 |

FOREIGN PATENT DOCUMENTS

| | | | | |
|---|---|---|---|---|
| KR | WO 2012020912 A2 * | 2/2012 | | E03C 1/298 |
| KR | 20150130291 | 11/2015 | | |

* cited by examiner

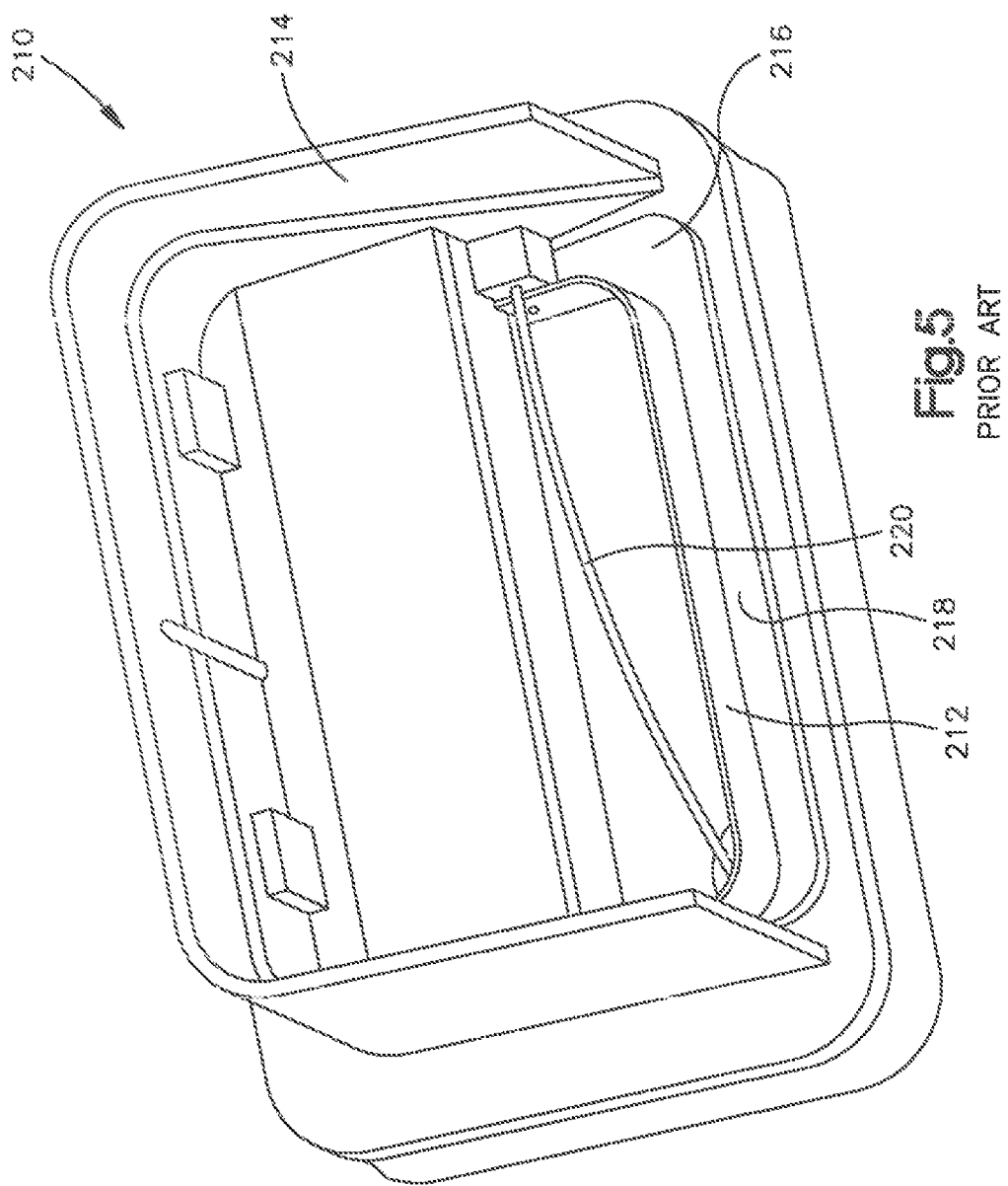

PRESSURE RELIEF VALVE

RELATED APPLICATION

This application corresponds to PCT/US2013/031272, filed Mar. 14, 2013, the subject matter of which is incorporated herein by reference in its entirety.

TECHNICAL FIELD

The present invention relates to the field of air vents in vehicles and more particularly, to a pressure relief valve for venting of air pressure out of a motor vehicle.

BACKGROUND OF THE INVENTION

Pressure relief valves are widely used in motor vehicles to relieve air pressure surges or peaks in the passenger compartment which result for example, when the doors are slammed shut. The valves generally comprise a simple rigid frame or housing which mounts in an aperture in a vehicle body panel. A valve element in the form of a flap is connected to the frame to overlie the aperture in the vehicle body panel. The valve element opens relative to the frame to uncover the aperture to relieve air pressure surges.

A known prior art pressure relief valve for a motor vehicle is illustrated in FIG. 5. The known prior art pressure relief valve 210 includes a rigid frame 212 pivotally mounted to a housing 214 of the pressure relief valve. The rigid frame 212 engages an outer surface 216 of a valve element 218 and pivots relative to the housing 214 when the valve element opens. A spring 220 has a first end connected to the rigid frame 212. A second end of the spring 220 is connected to the housing 214 of the pressure relief valve 210. The spring 220 urges the valve element 218 toward a closed position. The spring 220 extends adjacent to the outer surface 216 of the valve element 218. Therefore, the spring 220 is exposed to the elements outside the pressure relief valve 210.

SUMMARY OF THE INVENTION

An apparatus for use in venting a compartment in a vehicle includes a housing which at least partially defines an air flow passage. A valve element moves from a closed condition to an open condition to enable air to flow through the air flow passage. The valve element has an inner surface facing the air flow passage when the valve element is in the closed condition. The valve element has an outer surface opposite the inner surface facing away from the air flow passage when the valve element is in the closed condition. A spring wire deflects as the valve element moves from the closed condition toward the open condition and is effective to urge the valve element toward the closed condition. The spring wire extends in a straight line from the housing to the inner surface of the valve element when the valve element is in the closed condition.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is a pictorial view of a prior art pressure relief valve.

DESCRIPTION OF EXEMPLARY EMBODIMENTS

An exemplary embodiment of a pressure relief valve constructed in accordance with the present invention is illustrated in FIGS. 1-4. The pressure relief valve 10 according to the present invention may be located in an aperture of a vertical body panel of a motor vehicle, as known in the art. The pressure relief valve 10 can have alternative locations in the vehicle. The pressure relief valve 10 may be located in the area of the vehicle trunk which is connected to the passenger compartment. The pressure relief valve 10 of the present invention is designed to be mounted on the vertical panel of the vehicle.

Figure 1:
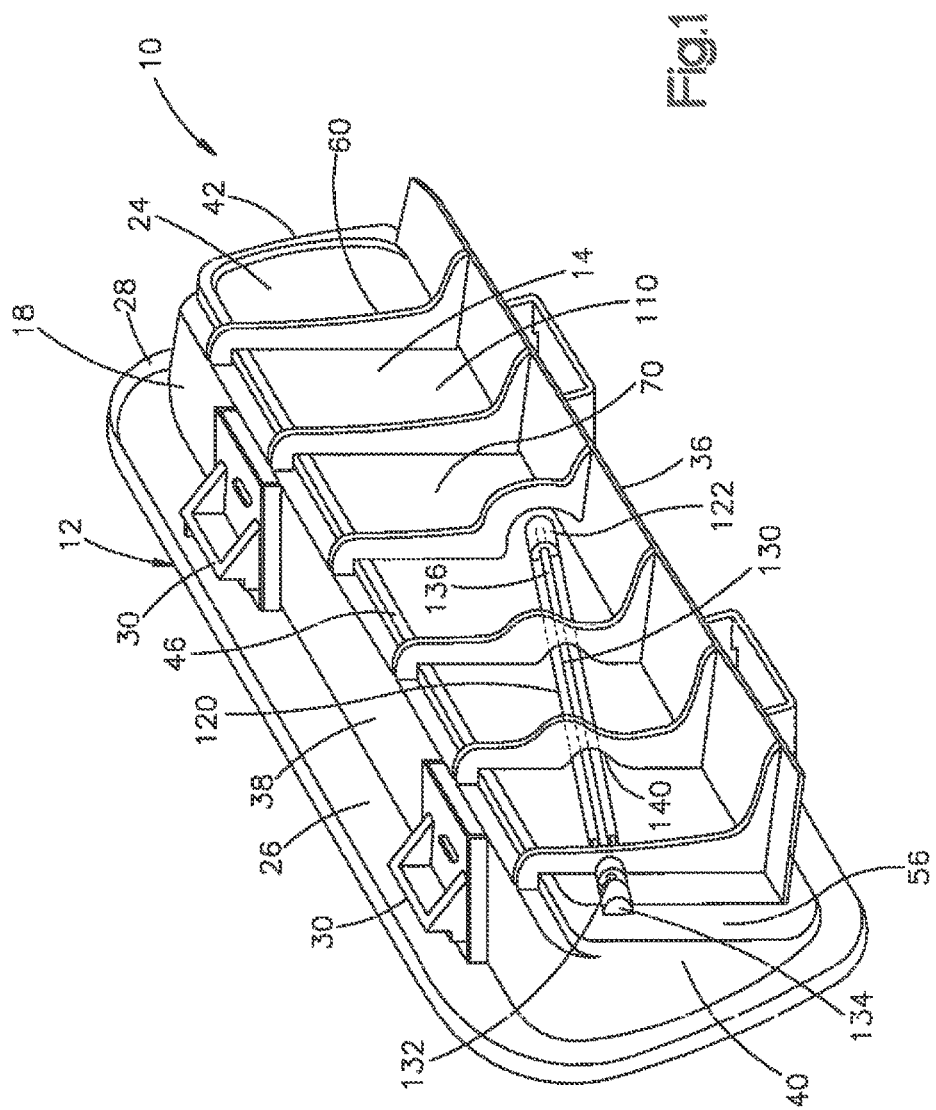
FIG. 1 Is a pictorial view of an exemplary embodiment of a pressure relief valve constructed in accordance with the present invention showing an inside of the pressure relief valve.
Figure 2:
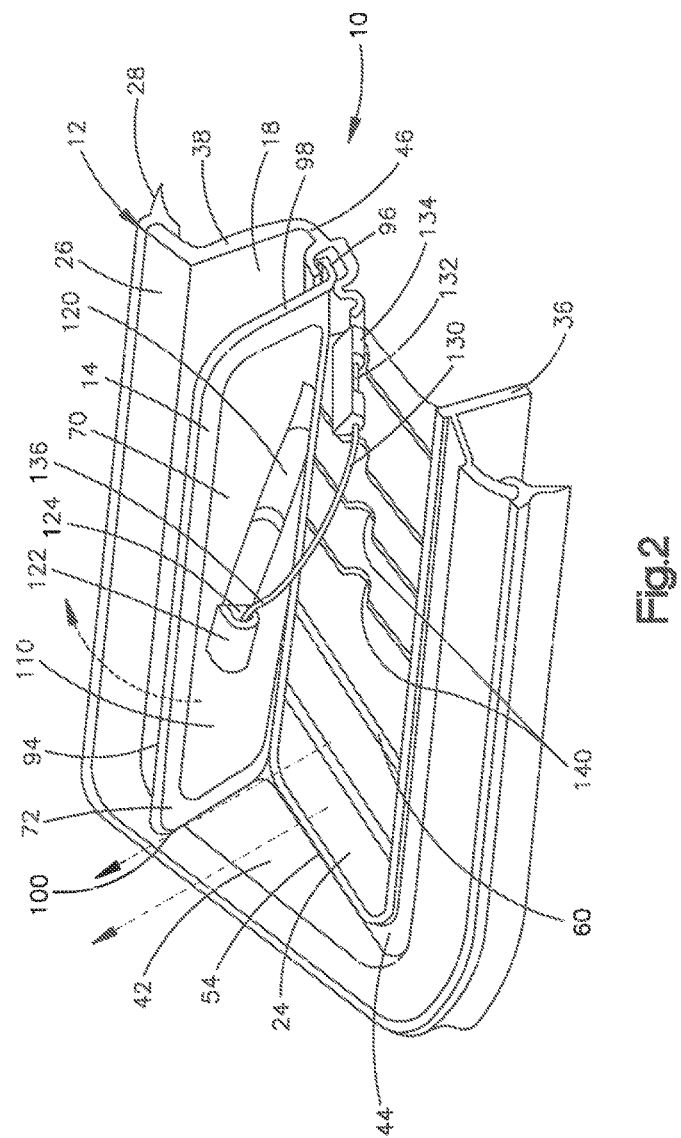
FIG. 2 is a partially cut away view of the pressure relief valve of FIG. 1 from outside the compartment, showing the pressure relief valve in an open condition.
Figure 3:
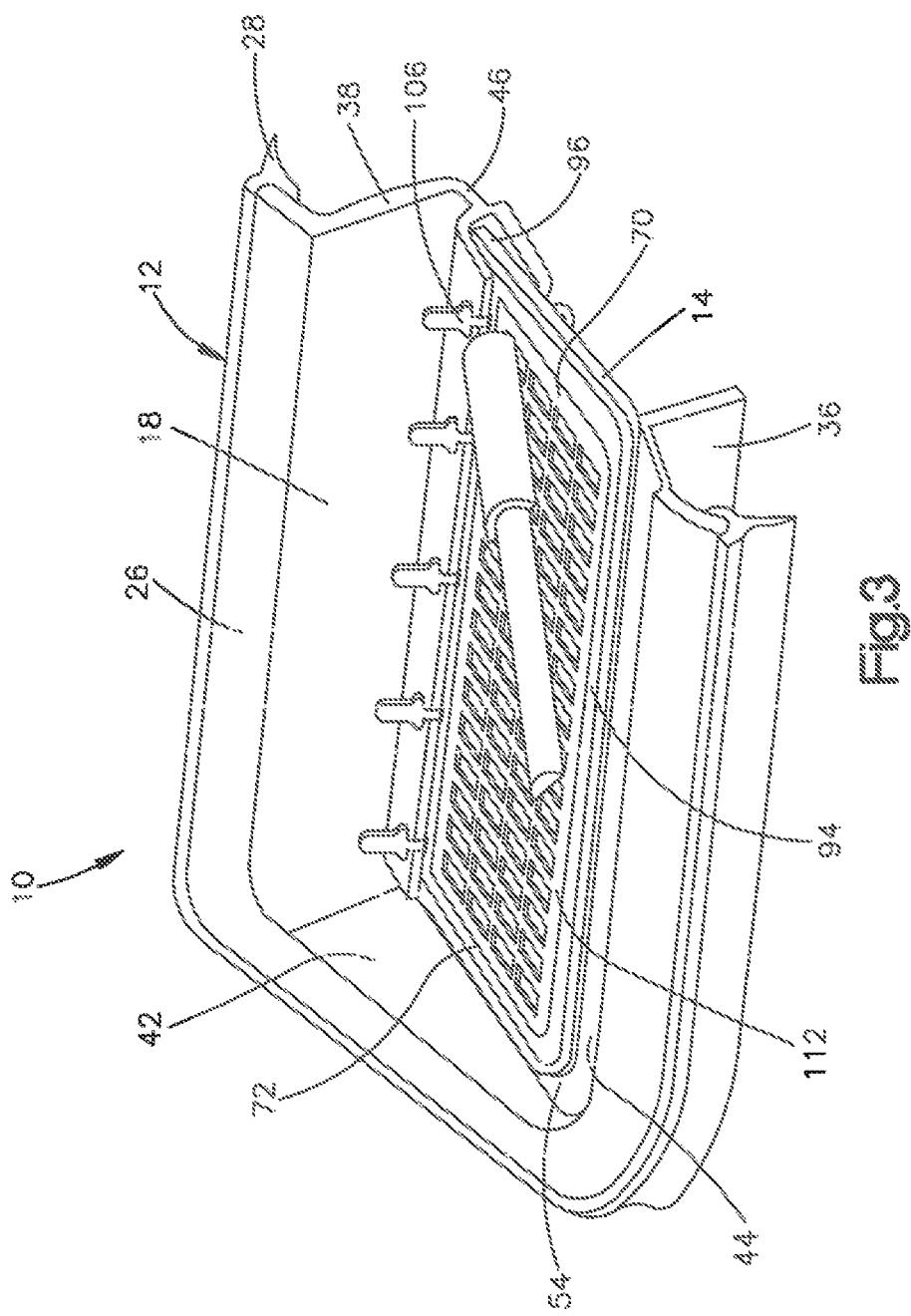
FIG. 3 is a partially cut away view of the pressure relief valve similar to FIG. 2 showing the pressure relief valve in the closed condition.
Figure 4:
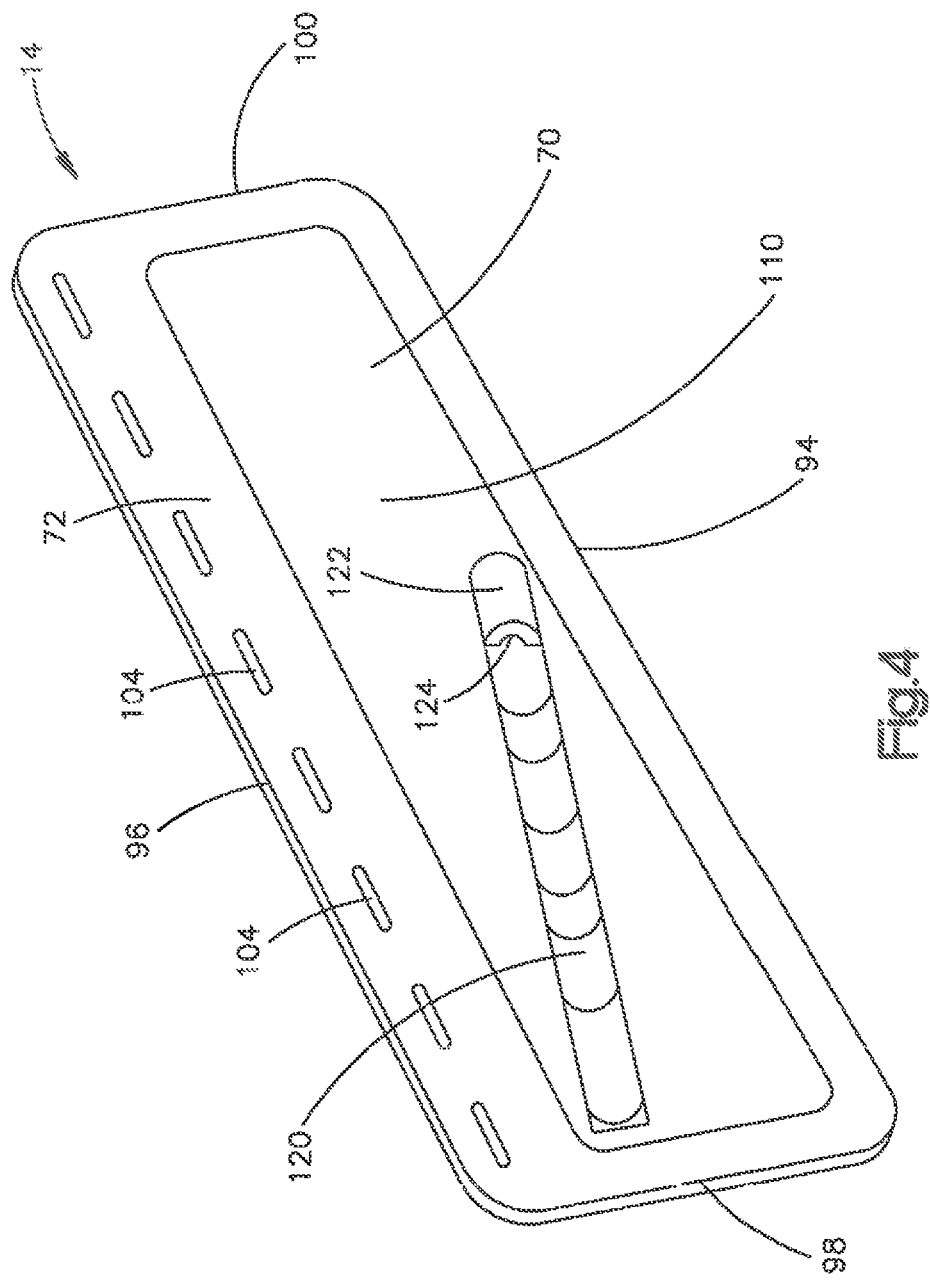
FIG. 4 is a pictorial view of a valve element of the pressure relief valve of FIG. 1.

The pressure relief valve 10 includes a housing 12 and a valve element or flap 14 (FIGS. 1-3). The housing 12 is a generally rectangular rigid structure. The housing 12 includes a side wall 18 which extends around the perimeter of the rectangular housing and defines at least one central air flow passage 24. The central air flow passage 24 connects the passenger compartment with the atmosphere outside the vehicle and establishes an equalized air pressure between the passenger compartment and the outside atmosphere. While the housing 12 has been described as having a generally rectangular structure, it should be understood, however, that the housing structure can have any geometry including, for example, square, triangular, polygonal, elliptical, and circular, etc.

A flange 26 extends around the perimeter of the housing 2. A flexible seal 28 may extend from the flange 26 and extend peripherally around the housing 12. When the pressure relief valve 10 is inserted into the aperture in the body panel, the flange 26 and the seal 28 may be forced into contact with the body panel at an area peripherally adjacent the side walls 18 of the housing 12. In the inserted position, the seal 28 is forced to spread outwardly and parallel relative to the body panel. The function of the seal 28 is to help seal the connection between the pressure relief valve 10 and the body panel of the vehicle against air, water, dust and foreign matter from passing through the aperture except through the central air passage 24. The pressure relief valve 10 includes latches 30 (FIG. 1) for connecting the pressure relief valve to the body panel in a known manner. It is contemplated that the pressure relief valve 10 may be fastened in the aperture of the body panel in any desired manner.

The side wall 18 of the housing 12 includes four side wall sections connected together. First and second longer side wall sections 36, 38 (FIG. 1) are located parallel to each other. First and second shorter side wall sections 40, 42 are located parallel to each other and perpendicular to the first and second longer side wall sections 36, 38.

The first longer side wall section 36 (FIGS. 2-3) includes a flange 44 extending inwardly into the central air flow passage 24 from a location approximately at the top of the side wall section 36. The second longer side wall 38 has a flange 46 extending inwardly into the central air flow passage 24 from a location near the bottom of the second longer side wall 38. The flanges 44, 46 on the first and second longer side wall sections 36, 38 are located at different heights along the wall 18 with respect to each other.

The second shorter side wall section 42 includes a flange 54 (FIG. 4) extending inwardly into the central air flow passage 24. The flange 54 extends diagonally along the inner surface of the second shorter side wall 42 from a top portion to a bottom portion of the second shorter side wall to connect the flanges 44 and 46 on the first and second longer side walls 36 and 38. The first shorter side wall 40 has a flange 56 (FIG. 1), similar to the flange 54, extending inwardly into the central air flow passage 24. The flange on the first shorter side wall 40 extends generally parallel to the flange 54 and diagonally along the inner surface of the first shorter side wall from a top portion to a bottom portion of the first shorter side wall to connect the flanges 44 and 46 on the first and second longer side walls 36 and 38. The valve element 14 may engage the flanges 44, 46, 54, and 56 on the side wall sections 36, 38, 40, 42 when in a closed condition preventing air flow through the passage 24.

The housing 12 (FIGS. 1 and 2) may include a plurality of ribs 60 extending between the first and second longer side walls 36 and 38. The ribs 60 extend generally perpendicular to the longer side wall sections 36 and 38 across the air flow passage 24. The valve element or flap 14 may engage the ribs 60 and the flanges on the side wall 18 to support the flap when in the closed condition. The flanges 44, 46, 54, 56 and the ribs 60 help prevent the flap 14 from moving into the air flow passage 24 when the pressure on the outside of the pressure relief valve 10 is greater than the pressure inside the pressure relief valve.

The valve element or flap 14 (FIG. 4) has a generally rectangular structure. It should also be understood that the flap 1 can have any shape, such as triangular or square. The valve element 14 may have a central portion 70 made of a rigid material, such as plastic. A peripheral portion 72 of the valve element 14 may be made of a flexible elastomeric material to provide a seal that prevents air, water, dust and foreign matter from entering through the air passage 24 into the passenger compartment when the valve element is in a closed condition.

The valve element 14 has first and second longer peripheral edges 94, 96 spaced apart and parallel to each other. First and second shorter peripheral edges 98, 100 extend generally perpendicular to the longer peripheral edges 94, 96. The first and second shorter peripheral edges 98, 100 are located spaced apart and parallel to each other.

The valve element 14 has a plurality of openings 104 extending through the second longer peripheral edge 96. Tabs 106 (FIG. 3) on the housing 12 extend through the openings 104 to connect the valve element 14 to the housing. It is contemplated that valve element 14 may be connected to the housing in any desired manner.

The valve element 14 has an inner side 110 (FIGS. 1 and 2) that faces toward the air flow passage 24 when the valve element is in the dosed condition. The valve element 14 has an outer side 112 opposite the inner side 110 that faces away from the air flow passage 24 when the valve element is in the closed condition. The central portion 70 (FIG. 4) of the valve element 14 has a recess 120 in the inner surface 110. The recess 120 extends diagonally from the intersection of the peripheral edges 96 and 98 toward the middle of the peripheral edge 94.

A projection 122 on the central portion 70 extends from the inner surface 110 of the valve element 14. The projection 122 extends from the valve element 14 adjacent a longitudinal end of the recess 120 adjacent the center of peripheral edge 94. The projection 122 has an opening 124 aligned with the longitudinal direction of the recess 120.

A spring 130 (FIGS. 1 and 2) applies a force to urge the valve element or flap 14 toward a closed condition shown in FIGS. 1 and 3. The spring 130 is a straight wire spring. The spring 130 has a first end portion 132 extending into a spring support 134 on the housing 12. The spring support 134 on the housing 12 extends from shorter side wall section 40 adjacent the longer side wall section 38. The first end portion 132 may slide relative to the spring support 134 during pivotal movement of the flap 14 relative to the housing 12.

A second end portion 136 of the spring 130 extends into the opening 124 in the projection 122 on the valve element 14. Accordingly, the spring 130 extends diagonally across the air flow passage 24. The ribs 60 of the housing 12 have notches 140 through which the spring 130 extends. The spring 130 extends in a straight line from the spring support 134 on the housing 12 through the recess 120 in the valve element 14 and into the projection 122 on the valve element when the valve element is in the closed condition. Thus, the spring 130 extends along the inner surface 110 of the valve element 14. The second end portion 136 may slide in the opening 124 during pivotal movement of the valve element 14 relative to the housing 12. Although the spring 130 is described as extending through a recess 120 in the inner surface 110 of the valve element 14, it is contemplated that the inner surface of the valve element may not include a recess.

The valve element 14 is movable between a closed condition overlying the central air flow passage 24, shown in FIGS. 1 and 3, and an open condition, shown in FIG. 2, to permit air flow through the central air flow passage 24 in only one direction. In the closed condition, the first and second shorter side edges 98, 100 are seated on the flanges 54, 56 extending from the side wall sections 40, 42. Similarly, in the closed condition, the first longer peripheral edge 94 of the valve element 14 is seated on the flange 44 of the first longer side wall section 36. The valve element 14 may also engage the ribs 60 when in the dosed condition. The valve element 14 is held in the closed condition by the spring 130 and gravity. The valve element 14 can only open in a direction outward of the housing 12 and cannot open in a direction into the housing 12 because the flanges and the ribs 60 block movement of the valve element inward.

The pressure relief valve 10 is mounted vertically in the body panel of the vehicle, in this orientation, the tabs 106 of the housing 12 are located near the top when mounted to the body panel. In the closed condition, the valve element 14 extends in a diagonally downward direction. The valve element 14 is acted on by gravity and the spring 130 to help keep the valve element in the closed condition when the difference between the air pressure within the passenger compartment of the vehicle and atmospheric pressure is below a predetermined value.

When atmospheric pressure is above the pressure within the passenger compartment of the vehicle, the atmospheric pressure acts against the valve element 14 to maintain the valve element in the closed condition. The valve element 14 does not rotate since the edges of the valve element are seated against the flanges and the ribs 60 to prevent movement of the valve element relative to the housing inward. As a result, air flow, water, dust, foreign matter from the atmosphere entering through the central air passage 24 into the passenger compartment of the vehicle is prevented.

When the air pressure within the passenger compartment is greater than atmospheric pressure by a predetermined level, i.e., a level to overcome the gravitational force and spring force upon the valve element 14, the valve element 14 will rotate, away from the central air passage 24 in a direction outward of the housing 12, to uncover the central air passage 24 and enable air flow from the passenger compartment to atmosphere.

When the valve element 14 rotates from the closed condition toward the open condition, the spring 130 bends. The projection 122 on the valve element 14 moves outwardly away from the ribs 60 as seen in FIG. 2. The first and second ends 132 and 136 of the spring 130 may slide relative to the housing 12 and the flap 14 during movement of the flap relative to the housing.

When the valve element 14 rotates to uncover the central air passage 24 and enable air flow from the passenger compartment to atmosphere, the valve element 14 is in the open condition. When the differential air pressure between the passenger compartment of the vehicle and atmosphere falls below the predetermined level, the gravitational force and spring force acting upon the valve element 14 cause the valve element to rotate back to the closed condition.

It is contemplated that instead of one flap valve element, multiple flap valve elements can be connected with the housing in multiple through holes to form the pressure relief valve 10.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in venting a compartment in a vehicle, the apparatus comprising:
   a housing which at least partially defines an air flow passage,
   a valve element which is movable from a closed condition to an open condition to enable air to flow through the air flow passage, the valve element having an inner surface facing the air flow passage when the valve element is in the closed condition, the valve element having an outer surface opposite the inner surface and facing away from the air flow passage when the valve element is in the closed condition, wherein the valve element further includes a recess in the inner surface, wherein the recess extends diagonally across the inner surface towards a middle of a lower peripheral edge; and
   a straight spring wire which is deflected as the valve element moves from the closed condition toward the open condition and is effective to urge the valve element toward the closed condition, the straight spring wire extending in a straight line from the housing to the inner surface of the valve element when the valve element is in the closed condition, wherein the straight spring wire extends through the recess.

2. The apparatus as set forth in claim 1 wherein the housing includes at least one rib extending across the air flow passage, the valve element engaging the at least one rib when in the closed position, the rib having a recess through which the straight spring wire extends when the valve element is in the closed condition.

3. The apparatus as set forth in claim 1 wherein the straight spring wire includes a first end portion connected to a second end portion, wherein the straight spring wire is straight from the first end portion to the second end portion when the valve element is in the closed condition.

4. The apparatus as set forth in claim 1 wherein the straight spring wire extends diagonally across the air flow passage when the valve element is in the closed condition.

5. The apparatus as set forth in claim 1 wherein the valve element includes:
   a central portion formed of plastic; and
   a peripheral portion extending outwardly from the central portion, wherein the peripheral portion is formed of a flexible elastomeric material,
   wherein the straight spring wire connects to the central portion of the valve element.

6. The apparatus as set forth in claim 1 wherein the valve element includes a rigid central portion and a flexible peripheral portion extending around the central portion, the straight spring wire being connected to the central portion.

7. The apparatus as set forth in claim 6 wherein the central portion includes a recess on an inner surface of the central portion, the straight spring wire extending through the recess in the central portion.

8. The apparatus as set forth in claim 1 wherein a first end of the straight spring wire extends into an opening in a projection extending from the inner surface of the valve element.

9. The apparatus as set forth in claim 8 wherein the first end of the straight spring wire slides relative to the projection during the movement of the valve element relative to the housing.

10. The apparatus as set forth in claim 8 wherein the second end of the straight wire extends into a spring support on the housing.

11. The appartatus as set forth in the claim 10 wherein the second end of the straight spring wire slides relative to the spring support during movement of the valve element relative to the housing.

12. An apparatus for use in venting a compartment in a vehicle, the apparatus comprising:
    a housing which at least partially defines an air flow passage,
    a valve element which is movable from a closed condition to an open condition to enable air to flow through the air flow passage, the valve element having an inner surface facing the air flow passage when the valve element is in the closed condition, the valve element having an outer surface opposite the inner surface and facing away from the air flow passage when the valve element is in the closed condition; and
    a straight spring wire which is deflected as the valve element moves from the closed condition toward the open condition and is effective to urge the valve element toward the closed condition, the straight spring wire extending in a straight line from the housing to the inner surface of the valve element when the valve element is in the closed condition, wherein the projection extends from the inner surface of the valve element adjacent a longitudinal end of a recess formed in the inner surface of the valve element.

13. A pressure relief valve that is configured to vent a compartment in a vehicle, the pressure relief valve comprising:
    a housing that defines at least a portion of an air flow passage,
    a valve element movable between a closed condition and an open condition, wherein the valve element comprises a recess extending diagonally across an inner surface towards a middle of a lower peripheral edge; and a straight spring wire that is configured to deflect as the valve element moves from the closed condition toward the open condition, wherein the straight spring wire urges the valve element toward the closed condition, and wherein the straight spring wire extends in a straight line from the housing to the inner surface of the valve element when the valve element is in the closed condition.

14. The pressure relief valve of claim 13, wherein the straight spring wire includes a first end portion connected to a second end portion, wherein the straight spring wire is straight from the first end portion to the second end portion when the valve element is in the closed condition.

15. The pressure relief valve of claim 13, wherein the straight spring wire extends diagonally across the air flow passage when the valve element is in the closed condition.

16. The pressure relief valve of claim 13, wherein the valve element includes:
    a central portion formed of plastic; and
    a peripheral portion extending outwardly from the central portion, wherein the peripheral portion is formed of a flexible elastomeric material,
    wherein the straight spring wire connects to the central portion of the valve element.

17. A pressure relief valve that is configured to vent a compartment in a vehicle, the pressure relief valve comprising:
    a housing that defines at least a portion of an air flow passage,
    a valve element movable between a closed condition and an open condition; and
    a straight spring wire that is configured to deflect as the valve element moves from the closed condition toward the open condition, wherein the straight spring wire urges the valve element toward the closed condition, and wherein the straight spring wire extends in a straight line from the housing to the inner surface of the valve element when the valve element is in the closed condition, wherein a first end of the straight spring wire extends into an opening in a projection extending from an inner surface of the valve element, wherein the projection extends from the inner surface of the valve element adjacent a longitudinal end of a recess formed in the inner surface of the valve element.

18. A pressure relief valve that is configured to vent a compartment in a vehicle, the pressure relief valve comprising:
    a housing that defines at least a portion of an air flow passage,
    a valve element movable between a closed condition and an open condition, wherein the valve element includes: (a) a central portion formed of plastic, (b) a peripheral portion extending outwardly from the central portion, wherein the peripheral portion is formed of a flexible elastomeric material, and (c) a recess extending diagonally across an inner surface towards a middle of a lower peripheral edge; and
    a straight spring wire that is configured to deflect as the valve element moves from the closed condition toward the open condition, wherein the straight spring wire includes a first end portion connected to a second end portion, wherein the straight spring wire is straight from the first end portion to the second end portion when the valve element is in the closed condition, wherein the straight spring wire urges the valve element toward the closed condition, and wherein the straight spring wire extends diagonally across the air flow passage when the valve element is in the closed condition.

* * * * *